United States Patent
Yu

(10) Patent No.: US 7,043,692 B2
(45) Date of Patent: May 9, 2006

(54) WINDOWS RESOURCE FILE PARAMETERIZATION SYSTEM AND METHOD

(75) Inventor: Zhongming Yu, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 811 days.

(21) Appl. No.: 09/737,941

(22) Filed: Dec. 18, 2000

(65) Prior Publication Data

US 2002/0154165 A1    Oct. 24, 2002

(51) Int. Cl.
*G06F 17/00* (2006.01)
*G06F 9/45* (2006.01)

(52) U.S. Cl. ............... 715/762; 717/106; 717/143; 717/154

(58) Field of Classification Search ............... 345/780, 345/760–763, 805, 803; 709/217, 226; 715/763, 715/765, 800, 801, 815; 717/106, 143, 151
See application file for complete search history.

(56) References Cited

U.S. PATENT DOCUMENTS

| | | | |
|---|---|---|---|
| 4,914,568 A * | 4/1990 | Kodosky et al. | 345/763 |
| 5,678,039 A | 10/1997 | Hinks et al. | |
| 5,694,608 A * | 12/1997 | Shostak | 715/506 |
| 5,831,616 A * | 11/1998 | Lee | 715/861 |
| 5,854,932 A * | 12/1998 | Mariani et al. | 717/116 |
| 5,870,088 A * | 2/1999 | Washington et al. | 345/781 |
| 5,917,730 A * | 6/1999 | Rittie et al. | 703/6 |
| 6,515,682 B1 * | 2/2003 | Washington et al. | 345/762 |

FOREIGN PATENT DOCUMENTS

| EP | 0 528 641 | 2/1993 |
|---|---|---|
| EP | 0 620 521 | 10/1994 |

OTHER PUBLICATIONS

Corel Draw, CorelDRAW 6 Suite User's Manual-vol. 1, Version 6.0, Corel Draw Corporation, 1996, pp. 1-21.*
Visual Basic 4, Visual Basic 4 Environment, Programming, & Applications, Que, 1996, pp. 2-9.*
Alan et al., Visual Basic 4.0, 1996, pp. 27, 28, and 91.*
David Geary, JSP templates, Sep. 2000, pp. 1-13.*
I. Sommerville, et al., Software-Practice and Experience, vol. 19, No. 4, XP-000007962, pp. 371-391, "The Eclipse User Interface", Apr. 1, 1989.

* cited by examiner

*Primary Examiner*—Ba Huynh
*Assistant Examiner*—Truc T. Chuong
(74) *Attorney, Agent, or Firm*—Oblon, Spivak, McClelland, Maier & Neustadt, P.C.

(57) ABSTRACT

A system and method which allows a software engineer to easily modify a resource file for a graphical user interface (GUI). A conventional hard-coded resource file is converted into a parameterized resource file with a header file. The parameterized resource file includes parameters for certain properties which were previously hard-coded in the hard-coded resource file. Further, the header file provides values for the parameters. With such a structure and operation, by changing the parameter values in the header file the parameterized resource file can be changed, thereby making it significantly easier to modify resource files, and accordingly to modify the display on graphical user interfaces. More particularly, a data structure is achieved which defines a graphical user interface. The data structure includes a first file which defines a display of a plurality of controls of the graphical user interface. The controls include, for at least one control, a control type, a dimension of the control, and text to be displayed adjacent to, or with, the control. Further, at least one of the dimension of the control in the text is a variable, i.e., a parameter. Further, a parameterization indicator indicates a parameterization for the variable in the first file. A header file is then configured to store a value for the variable.

6 Claims, 19 Drawing Sheets

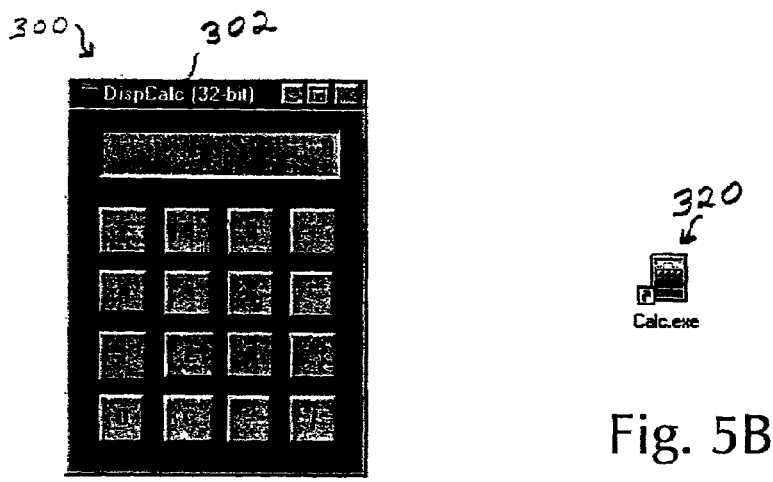
Fig. 5A
Fig. 5B
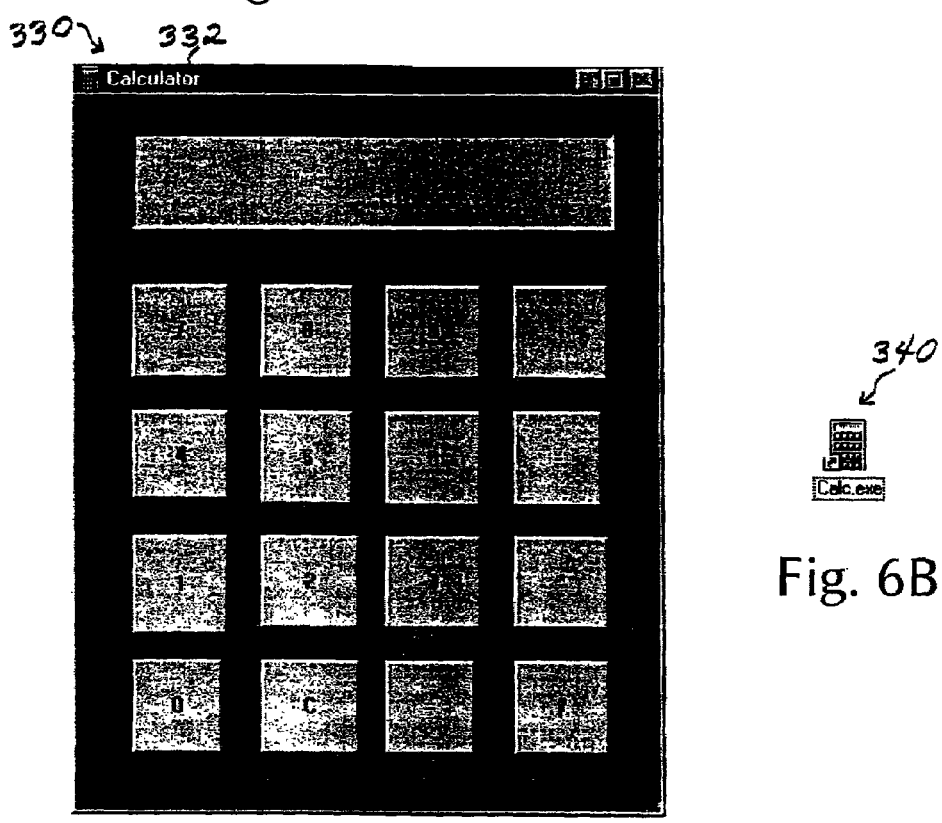
Fig. 6A
Fig. 6B

400

```
//Microsoft Developer Studio generated resource script.
// include "resrc1.h"

define APSTUDIO_READONLY_SYMBOLS
/////////////////////////////////////////////////////////////////////////////
//
// Generated from the TEXTINCLUDE 2 resource.
//
#define APSTUDIO_HIDDEN_SYMBOLS
#include "windows.h"
#undef APSTUDIO_HIDDEN_SYMBOLS
#include "resource.h"

/////////////////////////////////////////////////////////////////////////////
undef APSTUDIO_READONLY_SYMBOLS /////////////////////////////////////////////////////////////////////////////
// English (U.S.) resources if !defined(AFX_RESOURCE_DLL) || defined(AFX_TARG_ENU)
ifdef _WIN32
LANGUAGE LANG_ENGLISH, SUBLANG_ENGLISH_US
#pragma code_page(1252)
#endif //_WIN32

/////////////////////////////////////////////////////////////////////////////
//
// Icon
//

// Icon with lowest ID value placed first to ensure application icon
// remains consistent on all systems.
DISPCALC              ICON    DISCARDABLE     "dispcalc.ico"    416

/////////////////////////////////////////////////////////////////////////////
//
// Calc.rc                                        418
408  DISPCALC DIALOG DISCARDABLE  0, 0, 92, 114
     STYLE WS_MINIMIZEBOX | WS_CAPTION | WS_SYSMENU
412  CAPTION "DispCalc (32-bit)"
     CLASS "DispCalc"                           420
     BEGIN
         PUSHBUTTON      "0",IDC_ZERO,9,90,14,15
         PUSHBUTTON      "1",IDC_ONE,9,70,15,16
         PUSHBUTTON      "2",IDC_TWO,29,70,16,15
         PUSHBUTTON      "3",IDC_THREE,49,70,15,15
         PUSHBUTTON      "4",IDC_FOUR,9,50,15,14
         PUSHBUTTON      "5",IDC_FIVE,29,50,15,15
         PUSHBUTTON      "6",IDC_SIX,49,50,15,15
         PUSHBUTTON      "7",IDC_SEVEN,9,30,15,15
         PUSHBUTTON      "8",IDC_EIGHT,29,30,15,15
         PUSHBUTTON      "9",IDC_NINE,49,30,15,15
         PUSHBUTTON      "=",IDC_EQUALS,49,90,14,15
         PUSHBUTTON      "+",IDC_PLUS,69,30,15,15
         PUSHBUTTON      "-",IDC_MINUS,69,50,14,15
         PUSHBUTTON      "*",IDC_MULT,69,70,15,15
         PUSHBUTTON      "/",IDC_DIV,69,90,15,15
         PUSHBUTTON      "C",IDC_CLEAR,29,90,16,15
         EDITTEXT        IDC_DISPLAY,9,6,76,15,ES_RIGHT | ES_MULTILINE |
                         ES_AUTOHSCROLL | ES_READONLY
     END
```

Fig. 7A

```
#ifdef APSTUDIO_INVOKED
///////////////////////////////////////////////////////////////////////////
//
// TEXTINCLUDE
//

1 TEXTINCLUDE DISCARDABLE
BEGIN
    "resrc1.h\0"
END

2 TEXTINCLUDE DISCARDABLE
BEGIN
    "#define APSTUDIO_HIDDEN_SYMBOLS\r\n"
    "#include ""windows.h""\r\n"
    "#undef APSTUDIO_HIDDEN_SYMBOLS\r\n"
    "#include ""resource.h""\r\n"
    "\0"
END 3 TEXTINCLUDE DISCARDABLE
BEGIN
    "\r\n"
    "\0"
END endif    // APSTUDIO_INVOKED endif    // English (U.S.) resources
/////////////////////////////////////////////////////////////////////////// ifndef APSTUDIO_INVOKED
///////////////////////////////////////////////////////////////////////////
//
// Generated from the TEXTINCLUDE 3 resource.
//

///////////////////////////////////////////////////////////////////////////
#endif    // not APSTUDIO_INVOKED
```

Fig. 7B

```
500
//Microsoft Developer Studio generated resource script.
// include "resrcl.h"

define APSTUDIO_READONLY_SYMBOLS
/////////////////////////////////////////////////////////////////////////////
//
// Generated from the TEXTINCLUDE 2 resource.
//
#define APSTUDIO_HIDDEN_SYMBOLS
#include "windows.h"
#undef APSTUDIO_HIDDEN_SYMBOLS
#include "resource.h"

/////////////////////////////////////////////////////////////////////////////
undef APSTUDIO_READONLY_SYMBOLS /////////////////////////////////////////////////////////////////////////////
// English (U.S.) resources if !defined(AFX_RESOURCE_DLL) || defined(AFX_TARG_ENU)
ifdef _WIN32
LANGUAGE LANG_ENGLISH, SUBLANG_ENGLISH_US
#pragma code_page(1252)
#endif //_WIN32

/////////////////////////////////////////////////////////////////////////////
//
// Icon
//

// Icon with lowest ID value placed first to ensure application icon
// remains consistent on all systems.
DISPCALC                ICON    DISCARDABLE     "dispcalc.ico"

/////////////////////////////////////////////////////////////////////////////
//
// Calc.rc
#include "rcparam.h"

502  //#IV
DISPCALC DIALOG DISCARDABLE  0, 0, 92, 114
STYLE WS_MINIMIZEBOX | WS_CAPTION | WS_SYSMENU
CAPTION "DispCalc (32-bit)"
CLASS "DispCalc"

BEGIN
    PUSHBUTTON      "0",IDC_ZERO,9,90,14,15
    PUSHBUTTON      "1",IDC_ONE,9,70,15,16
    PUSHBUTTON      "2",IDC_TWO,29,70,16,15
    PUSHBUTTON      "3",IDC_THREE,49,70,15,15
    PUSHBUTTON      "4",IDC_FOUR,9,50,15,14
    PUSHBUTTON      "5",IDC_FIVE,29,50,15,15
    PUSHBUTTON      "6",IDC_SIX,49,50,15,15
    PUSHBUTTON      "7",IDC_SEVEN,9,30,15,15
    PUSHBUTTON      "8",IDC_EIGHT,29,30,15,15
    PUSHBUTTON      "9",IDC_NINE,49,30,15,15
    PUSHBUTTON      "=",IDC_EQUALS,49,90,14,15
    PUSHBUTTON      "+",IDC_PLUS,69,30,15,15
    PUSHBUTTON      "-",IDC_MINUS,69,50,14,15
    PUSHBUTTON      "*",IDC_MULT,69,70,15,15
    PUSHBUTTON      "/",IDC_DIV,69,90,15,15
    PUSHBUTTON      "C",IDC_CLEAR,29,90,16,15
    EDITTEXT        IDC_DISPLAY,9,6,76,15,ES_RIGHT | ES_MULTILINE |
                    ES_AUTOHSCROLL | ES_READONLY
504  END //#0
```

Fig. 8A

```
#ifdef APSTUDIO_INVOKED
/////////////////////////////////////////////////////////////////////////////
//
// TEXTINCLUDE
//

1 TEXTINCLUDE DISCARDABLE
BEGIN
    "resrc1.h\0"
END

2 TEXTINCLUDE DISCARDABLE
BEGIN
    "#define APSTUDIO_HIDDEN_SYMBOLS\r\n"
    "#include ""windows.h""\r\n"
    "#undef APSTUDIO_HIDDEN_SYMBOLS\r\n"
    "#include ""resource.h""\r\n"
    "\0"
END 3 TEXTINCLUDE DISCARDABLE
BEGIN
    "\r\n"
    "\0"
END endif    // APSTUDIO_INVOKED endif    // English (U.S.) resources
///////////////////////////////////////////////////////////////////////////// ifndef APSTUDIO_INVOKED
/////////////////////////////////////////////////////////////////////////////
//
// Generated from the TEXTINCLUDE 3 resource.
//

/////////////////////////////////////////////////////////////////////////////
#endif    // not APSTUDIO_INVOKED
```

Fig. 8B

```
DISPCALC DIALOG DISCARDABLE  0, 0, 92, 114
STYLE WS_MINIMIZEBOX | WS_CAPTION | WS_SYSMENU
CAPTION "DispCalc (32-bit)"
CLASS "DispCalc"

BEGIN
    PUSHBUTTON      "0",IDC_ZERO,9,90,14,15
//#VIII FIRST_ROW
    PUSHBUTTON      "1",IDC_ONE,9,70,15,16
    PUSHBUTTON      "2",IDC_TWO,29,70,16,15
    PUSHBUTTON      "3",IDC_THREE,49,70,15,15
//#0
    PUSHBUTTON      "4",IDC_FOUR,9,50,15,14
    PUSHBUTTON      "5",IDC_FIVE,29,50,15,15
    PUSHBUTTON      "6",IDC_SIX,49,50,15,15
    PUSHBUTTON      "7",IDC_SEVEN,9,30,15,15
    PUSHBUTTON      "8",IDC_EIGHT,29,30,15,15
    PUSHBUTTON      "9",IDC_NINE,49,30,15,15
    PUSHBUTTON      "=",IDC_EQUALS,49,90,14,15
    PUSHBUTTON      "+",IDC_PLUS,69,30,15,15
    PUSHBUTTON      "-",IDC_MINUS,69,50,14,15
    PUSHBUTTON      "*",IDC_MULT,69,70,15,15
    PUSHBUTTON      "/",IDC_DIV,69,90,15,15
    PUSHBUTTON      "C",IDC_CLEAR,29,90,16,15
    EDITTEXT        IDC_DISPLAY,9,6,76,15,ES_RIGHT | ES_MULTILINE |
                    ES_AUTOHSCROLL | ES_READONLY
END
```

520 → //#VIII FIRST_ROW
522 → //#0

```
//Microsoft Developer Studio generated resource script.
//
/// Parameterizor generated:
#include "rcparam.h"

#include "resrcl.h"

define APSTUDIO_READONLY_SYMBOLS
/////////////////////////////////////////////////////////////////////////////
//
// Generated from the TEXTINCLUDE 2 resource.
//
#define APSTUDIO_HIDDEN_SYMBOLS
#include "windows.h"
#undef APSTUDIO_HIDDEN_SYMBOLS
#include "resource.h"

/////////////////////////////////////////////////////////////////////////////
undef APSTUDIO_READONLY_SYMBOLS /////////////////////////////////////////////////////////////////////////////
// English (U.S.) resources if !defined(AFX_RESOURCE_DLL) || defined(AFX_TARG_ENU)
ifdef _WIN32
LANGUAGE LANG_ENGLISH, SUBLANG_ENGLISH_US
#pragma code_page(1252)
#endif //_WIN32
```

Fig. 9A

```
//////////////////////////////////////////////////////////////////////
//
// Icon
//

// Icon with lowest ID value placed first to ensure application icon
// remains consistent on all systems.
/// Parameterizor generated:                             ~610
DISPCALC            ICON    DISCARDABLE    DISPCALC_ICON //////////////////////////////////////////////////////////////////////
//
// Calc.rc                                               618
#include "rcparam.h"

608  DISPCALC DIALOG DISCARDABLE  0*DISPCALC_X_SCALE, 0*DISPCALC_Y_SCALE, 92*DISPCALC_W_SCALE,
     114*DISPCALC_H_SCALE
     STYLE WS_MINIMIZEBOX | WS_CAPTION | WS_SYSMENU
612  CAPTION DISPCALC_CAPTION                           620
     CLASS "DispCalc"
     BEGIN
         PUSHBUTTON      "0",IDC_ZERO, 9*DISPCALC_X_SCALE, 90*DISPCALC_Y_SCALE, 14*DISPCALC_W_SCALE,
         15*DISPCALC_H_SCALE
         PUSHBUTTON      "1",IDC_ONE,9*DISPCALC_X_SCALE, 70*DISPCALC_Y_SCALE, 15*DISPCALC_W_SCALE,
         16*DISPCALC_H_SCALE
         PUSHBUTTON      "2",IDC_TWO,29*DISPCALC_X_SCALE, 70*DISPCALC_Y_SCALE, 16*DISPCALC_W_SCALE,
         15*DISPCALC_H_SCALE
         PUSHBUTTON      "3",IDC_THREE,49*DISPCALC_X_SCALE, 70*DISPCALC_Y_SCALE, 15*DISPCALC_W_SCALE,
         15*DISPCALC_H_SCALE PUSHBUTTON      "4",IDC_FOUR,9*DISPCALC_X_SCALE, 50*DISPCALC_Y_SCALE, 15*DISPCALC_W_SCALE,
         14*DISPCALC_H_SCALE
         PUSHBUTTON      "5",IDC_FIVE,29*DISPCALC_X_SCALE, 50*DISPCALC_Y_SCALE, 15*DISPCALC_W_SCALE,
         15*DISPCALC_H_SCALE
         PUSHBUTTON      "6",IDC_SIX,49*DISPCALC_X_SCALE, 50*DISPCALC_Y_SCALE, 15*DISPCALC_W_SCALE,
         15*DISPCALC_H_SCALE
         PUSHBUTTON      "7",IDC_SEVEN,9*DISPCALC_X_SCALE, 30*DISPCALC_Y_SCALE, 15*DISPCALC_W_SCALE,
         15*DISPCALC_H_SCALE
         PUSHBUTTON      "8",IDC_EIGHT,29*DISPCALC_X_SCALE, 30*DISPCALC_Y_SCALE, 15*DISPCALC_W_SCALE,
         15*DISPCALC_H_SCALE
         PUSHBUTTON      "9",IDC_NINE,49*DISPCALC_X_SCALE, 30*DISPCALC_Y_SCALE, 15*DISPCALC_W_SCALE,
         15*DISPCALC_H_SCALE
         PUSHBUTTON      "=",IDC_EQUALS,49*DISPCALC_X_SCALE, 90*DISPCALC_Y_SCALE, 14*DISPCALC_W_SCALE,
         15*DISPCALC_H_SCALE
         PUSHBUTTON      "+",IDC_PLUS,69*DISPCALC_X_SCALE, 30*DISPCALC_Y_SCALE, 15*DISPCALC_W_SCALE,
         15*DISPCALC_H_SCALE
         PUSHBUTTON      "-",IDC_MINUS,69*DISPCALC_X_SCALE, 50*DISPCALC_Y_SCALE, 14*DISPCALC_W_SCALE,
         15*DISPCALC_H_SCALE
         PUSHBUTTON      "*",IDC_MULT,69*DISPCALC_X_SCALE, 70*DISPCALC_Y_SCALE, 15*DISPCALC_W_SCALE,
         15*DISPCALC_H_SCALE
         PUSHBUTTON      "/",IDC_DIV,69*DISPCALC_X_SCALE, 90*DISPCALC_Y_SCALE, 15*DISPCALC_W_SCALE,
         15*DISPCALC_H_SCALE
         PUSHBUTTON      "C",IDC_CLEAR,29*DISPCALC_X_SCALE, 90*DISPCALC_Y_SCALE, 16*DISPCALC_W_SCALE,
         15*DISPCALC_H_SCALE
         EDITTEXT        IDC_DISPLAY,9*DISPCALC_X_SCALE, 6*DISPCALC_Y_SCALE, 76*DISPCALC_W_SCALE,
         15*DISPCALC_H_SCALE, ES_RIGHT | ES_MULTILINE |
                         ES_AUTOHSCROLL | ES_READONLY
     END
```

Fig. 9B

```
#ifdef APSTUDIO_INVOKED
//////////////////////////////////////////////////////////////////////
//
// TEXTINCLUDE
//

1 TEXTINCLUDE DISCARDABLE
BEGIN
    "resrc1.h\0"
END

2 TEXTINCLUDE DISCARDABLE
BEGIN
    "#define APSTUDIO_HIDDEN_SYMBOLS\r\n"
    "#include ""windows.h""\r\n"
    "#undef APSTUDIO_HIDDEN_SYMBOLS\r\n"
    "#include ""resource.h""\r\n"
    "\0"
END 3 TEXTINCLUDE DISCARDABLE
BEGIN
    "\r\n"
    "\0"
END endif    // APSTUDIO_INVOKED endif    // English (U.S.) resources
////////////////////////////////////////////////////////////////////// ifndef APSTUDIO_INVOKED
//////////////////////////////////////////////////////////////////////
//
// Generated from the TEXTINCLUDE 3 resource.
//
//////////////////////////////////////////////////////////////////////
#endif    // not APSTUDIO_INVOKED
```

```
PUSHBUTTON    "1",IDC_ONE,9*FIRST_ROW_X_SCALE, 70*FIRST_ROW_Y_SCALE,
15*FIRST_ROW_W_SCALE, 16*FIRST_ROW_H_SCALE
PUSHBUTTON    "2",IDC_TWO,29*FIRST_ROW_X_SCALE, 70*FIRST_ROW_Y_SCALE,
16*FIRST_ROW_W_SCALE, 15*FIRST_ROW_H_SCALE
PUSHBUTTON    "3",IDC_THREE,49*FIRST_ROW_X_SCALE, 70*FIRST_ROW_Y_SCALE,
15*FIRST_ROW_W_SCALE, 15*FIRST_ROW_H_SCALE
```

710 — #define DISPCALC_ICON         "dispcalc.ico"
712 — #define DISPCALC_CAPTION      "DispCalc (32-bit)"
720 — #define DISPCALC_X_SCALE      1
      #define DISPCALC_Y_SCALE      1
      #define DISPCALC_W_SCALE      1
      #define DISPCALC_H_SCALE      1

810 — #define DISPCALC_ICON         "calc.ico"
812 — #define DISPCALC_CAPTION      "Calculator"
820 — #define DISPCALC_X_SCALE      2
      #define DISPCALC_Y_SCALE      2
      #define DISPCALC_W_SCALE      2
      #define DISPCALC_H_SCALE      2

832 → #define FIRST_ROW_X_SCALE    1
     #define FIRST_ROW_Y_SCALE    1
     #define FIRST_ROW_W_SCALE    1
     #define FIRST_ROW_H_SCALE    1

Fig. 10C

WINDOWS RESOURCE FILE PARAMETERIZATION SYSTEM AND METHOD

BACKGROUND OF THE INVENTION

1. Field of the Invention

The present invention is directed to a system and method which provides a software engineer with a tool to create a graphical user interface (GUI) which can be easily modified and reused with a Windows™ programming system or other system capable of supporting GUIs.

2. Discussion of the Backgound

The Integrated Development Environment (IDE), or the Visual C/C++ Studio of Microsoft™ Visual C/C++ is an industrial standard for software developers to build graphical user interfaces (GUIs) which may be major portions of software products. A software engineer can easily build his or her GUI objects by utilizing a standard mouse and/or keyboard action via What You See Is What You Get (WYSIWYG) techniques. The IDE automatically generates a corresponding resource file which is a text script describing the properties which the software engineer has visually designed. IDE and Visual C++ are described, for example, in the books "Microsoft Visual C++ Development System for Windows 95 and Windows NT Version 4," by Microsoft Corporation, from Microsoft Press, 1995 and "Programming Windows 95" by Charles Petzgold, from Microsoft Press, 1996, both of which are incorporated herein by reference in their entirety.

In building a graphical user interface, a software engineer works with various objects such as dialog boxes for a variety of controls (e.g., a CHECKBOX, a COMBOBOX, a TEXT, a DEFPUSHBUTTON, etc.). Such dialog boxes are typically the most important objects of a Windows™ GUI. Other objects a software designer typically utilizes are string tables which define wording strings used in the GUI and graphics file names, e.g., for an icon (.ICO) and a picture (.BMP).

A conventional exemplary operation for a software engineer generating a GUI with Microsoft Visual C/C++ is shown in FIG. 1. As shown in FIG. 1, after beginning the construction of a GUI, a software engineer utilizes the IDE of Windows™ to create a resource file 10 by utilizing a visual GUI builder and a resource compiler and viewer. The software engineer also generates processing files 15 by utilizing Visual C/C++ and an editor/compiler/linker. The standard C/C++ Builder is then utilized on the generated resource files 10 and processing files 15 to create a Windows™ software product 5.

In the resource files 10, a dialog object is defined as a template which includes three different components (1)–(3) of (1) object geometry type, (2) object dimensions, and (3) other attributes. The object geometry type (1) indicates the type of object, such as a control type (e.g., EDITTEXT, GROUPBOX, LISTBOX, PUSHBUTTON, etc.). The object dimensions (2) typically utilize four-coupled absolute values to define an object window with the values: <x, y, width, height> in which x and y are coordinates of a point of an upper-left corner portion of a window, and the width and height indicate the width and height values of the window respectively. The other attributes (3) typically include a title/caption, visibility, graphic style, hot key, etc. Further, a PUSHBUTTON as an object geometry type may provide a link to a next level (e.g., child) dialog box.

As noted above, after forming the resource file 10 and the processing files 15, the software engineer utilizes the standard C/C++ Builder to generate the Windows™ software product 5.

In the system shown in FIG. 1 the resource files 10 are generated by the IDE in hard code, i.e., the resource files 10 are generated such that all the object (control) types, attributes, and dimensions are based on constant ID strings, constant name strings, and constant numbers. As a result of the hard coding of the resource files 10, it may be difficult and time consuming to modify such resource files 10. As examples, it is not usually an easy task to resize, reallocate, or rearrange dialogs around an existing GUI when generated in the hard coded manner as noted above, nor is it usually easy to internationalize an existing GUI for a number of foreign languages.

As an example of resource files generated with the conventional system of FIG. 1, attention is directed to FIGS. 5A–5B. FIG. 5A illustrates an exemplary calculator GUI 300 to be displayed on Windows 95. The calculator GUI 300 includes a title 302 which is displayed as "DispCalc (32-bit)." The actual display size of the calculator GUI 300 is approximately 2 inches by 3 inches in width and height, respectively. FIG. 5B illustrates an exemplary calculator icon 320 which is used to access the calculator GUI. The calculator icon 320 includes 3 rows and 4 columns of buttons, while the calculator GUI 300 includes 4 rows and 4 columns of buttons.

FIGS. 7A–7B illustrate a standard resource file 400 generated by a software designer building the calculator GUI 300 with the calculator icon 320 of FIGS. 5A–5B. As shown in FIGS. 7A–7B, the object control types, geometry types, dimensions, and other attributes are hard-coded. For example, with respect to a definition of a calculator PUSHBUTTON "0" a text 420, i.e. the values "9, 90, 14, 15", correspond to the object dimensions x, y, width, height for the calculator PUSHBUTTON "0" as shown in FIG. 5A. A hard-coded text 418 of FIG. 7A defines the values "0, 0, 92, 114", corresponding to the object dimensions x, y, width, height for the calculator 300 as shown in FIG. 5A. A hard-coded text 410 of FIG. 7A defines the file name "dispcalc.ico" of an icon for displaying the icon 320 shown in FIG. 5B. A hard-coded text 412 of FIG. 7A defines the caption "DispCalc (32-bit)" to be displayed as the calculator caption 302 shown in FIG. 5A.

As an example, it is desired to modify the calculator 300 displayed in FIG. 5A to be displayed as twice the size shown in FIG. 5A, and to modify the caption 302 displaying "DispCalc (32-bit)" to display "Calculator." A calculator GUI 330 as shown in FIG. 6A shows the result of doubling the size of the calculator 300 of FIG. 5A, and of modifying the caption 302 to a caption 332 displaying "Calculator" in FIG. 6A. It is also desired to modify the icon 320 shown in FIG. 5B, which has three rows and four columns of buttons, to more accurately reflect the calculator to be displayed, which has four rows and four columns of buttons. A calculator icon 340 of FIG. 6B shows a modified icon having the desired four rows and four columns of buttons. As a result of the hard-coding of the resource file of FIGS. 7A–7B, it may be a time consuming operation for a software engineer to modify the resource files to obtain the modified calculator and icon displays of FIGS. 6A–6B.

To modify an existing hard-coded resource file, one usually manually changes all related objects including four-coupled dimensions, caption strings, object titles, words in the string tables, icon and bit map file names, etc. by using an appropriate editor.

There are several tasks which a software engineer may wish to execute in modifying resource files. As other examples, assume that a software engineer wishes to execute any of the following three tasks (1)–(3). In a first task (1), in a dialog window there is a button leading to a child-dialog. The first task (1) is to expand the dialog window, remove the child-dialog button, and move the child-dialog into the expanded parent-dialog window. The second task (2) relates to a localization or internationalization task that translates a resource file for a different language, such as translating a resource file from English to French. For example, a static text control may contain the phrase "Type up to eight alphanumeric characters" in English, and the task may be to translate that phrase to a longer sentence "Vous pouvez entrer 8 charactères alphanumériques" in French. The third task (3) may be zooming in or zooming out of the entire GUI complex of a windows application with a certain scale ratio.

Conventionally, each of the above tasks (1)–(3) is executed by a software engineer either by visually modifying a resource file opened with the IDE, or by manually changing all the dimension numbers.

SUMMARY OF THE INVENTION

Accordingly, one object of the present invention is to provide a novel system, method and computer program product which allows a software engineer to easily modify a resource file for a graphical user interface (GUI) by parameterizing hard-coded parameters and other attributes in the resource file.

The Applicant of the present invention has recognized that in performing several types of tasks, such as the tasks of modifying the calculator GUIs of FIGS. 5A–5B, and tasks (1)–(3) noted above, on a graphical user interface made with Microsoft Visual C/C++, significant numbers of changes are required to be made, which may result in errors in performing the tasks.

Accordingly, an object of the present invention is to overcome the above-noted and other drawbacks with conventional software development.

A more specific object of the present invention is to provide a novel system, method and computer program product for modifying dimension expressions and caption strings in hard-coded resource files by introducing adjustable parameters for the dimension expressions and caption strings into the existing hard-coded resource files.

The present invention achieves the above and other objects by converting a conventional hard-coded resource file, such as resource file 10 shown in FIG. 1, into a parameterized resource file with a header file (i.e., a file that is identified to be included at the beginning of a program in a language such as C/C++ that contains the definitions of data types and declarations of variables used by the functions in the program). The parameterized resource file includes parameters for certain properties which were previously hard-coded in the hard-coded resource file. Further, the header file provides values for the parameters. With such a structure and operation in the present invention, by changing the parameter values in the header file, the parameterized resource file can be changed. Thus, it becomes significantly easier to modify resource files, and accordingly to modify the display of graphical user interfaces.

More particularly, the present invention achieves the above and other objects by providing a data structure which defines a graphical user interface. The data structure includes a first file which defines a display of a plurality of controls of the graphical user interface. The controls include, for at least one control, a control type, a dimension of the control, and text to be displayed with the control. Further, at least one of the dimensions of the control in the text is a variable, i.e., a parameter. Further, a parameterization indicator indicates a parameterization for the variable in the first file. A header file is configured to store a value for the variable.

By changing the value for the variable in the header file, the display of the control can be changed. As examples, a positioning or scaling of the variable can be changed, a text can be changed from a first language to a second language, a caption can be changed to a different caption, icons can be substituted for other icons, etc.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 5A–5B illustrate an exemplary graphical user interface and an icon;

FIGS. 6A–6B illustrate exemplary modifications to the graphical user interface and an icon of FIGS. 5A–5B.

FIGS. 7A–7B are a conventional resource file corresponding to the graphical user interface and icon of FIGS. 5A–5B;

FIGS. 8A–8B are a modification of the conventional resource file of FIGS. 7A–7B with an implicit directive added;

FIG. 8C is a modification of the code of the conventional resource file of FIG. 7A with an explicit directive and a global ID added;

FIGS. 9A–9C are an exemplary generated parameterized resource file based on the modification of the conventional resource file shown in FIGS. 8A–8B;

FIG. 9D is an exemplary generated parameterized code portion of the resource file based on the modification of the conventional resource file shown in FIG. 8C;

FIG. 10 is an exemplary parameterized resource header file generated for the parameterized resource file of FIGS. 9A–9B;

FIG. 10 is an exemplary parameterized resource header file generated by a user for the parameterized resource file of FIGS. 9A–9B to generate the graphical user interface and icon shown in FIGS. 6A–6B;

FIG. 10 is an exemplary parameterized resource header file generated by a user for initializing the parameterized code portion of the resource file of FIG. 9D;

DESCRIPTION OF THE PREFERRED EMBODIMENTS

Figure 2:
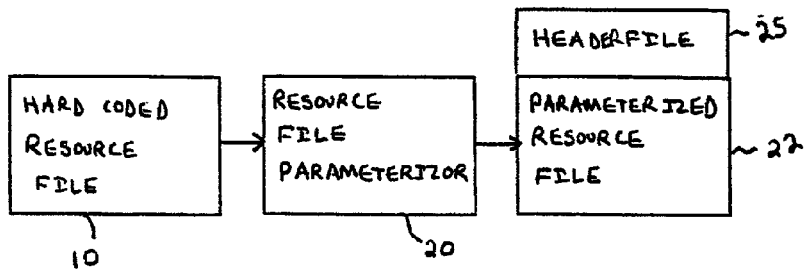
FIG. 2 illustrates a modification of a hard-coded source file into a parameterized resource file and header file.

Referring now to the drawings, wherein like reference numerals designate identical or corresponding parts throughout the several views, and more particularly to FIG. 2 thereof, there is illustrated an overall view of the parameterization operation of the present invention. More specifically, as discussed above, the conventional software development system generates a resource file 10. The resource file 10 is a hard-coded resource file as noted above.

In the present invention, as shown in FIG. 2, the hard-coded resource file 10 is passed through a resource file parameterizer 20, to thereby convert the hard-coded resource file 10 into a parameterized resource file 22 with a header file 25. The parameterized resource file 22 includes, e.g., variables for the dimensions of x and y coordinates and height and width, and the header file 25 includes argument values for the soft-coded parameters. As a result, with the parameterization operation of the present invention the soft-coded parameterized resource file 22 can be easily adapted by changing the parameter values in the header file 25.

Figure 1:
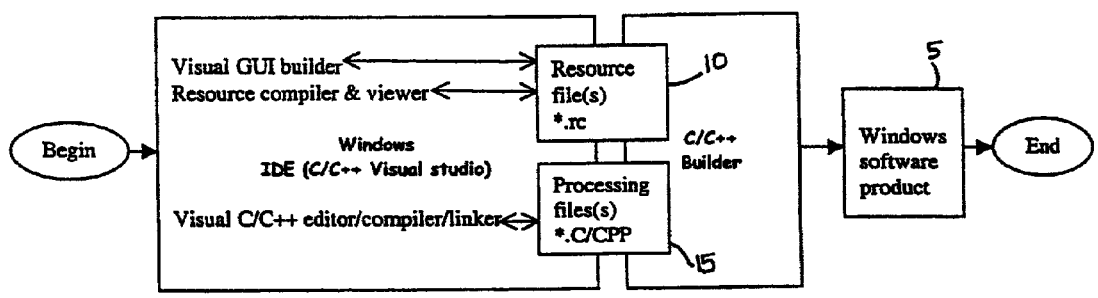
FIG. 1 illustrates a conventional software development operation and work flow.
Figure 3:
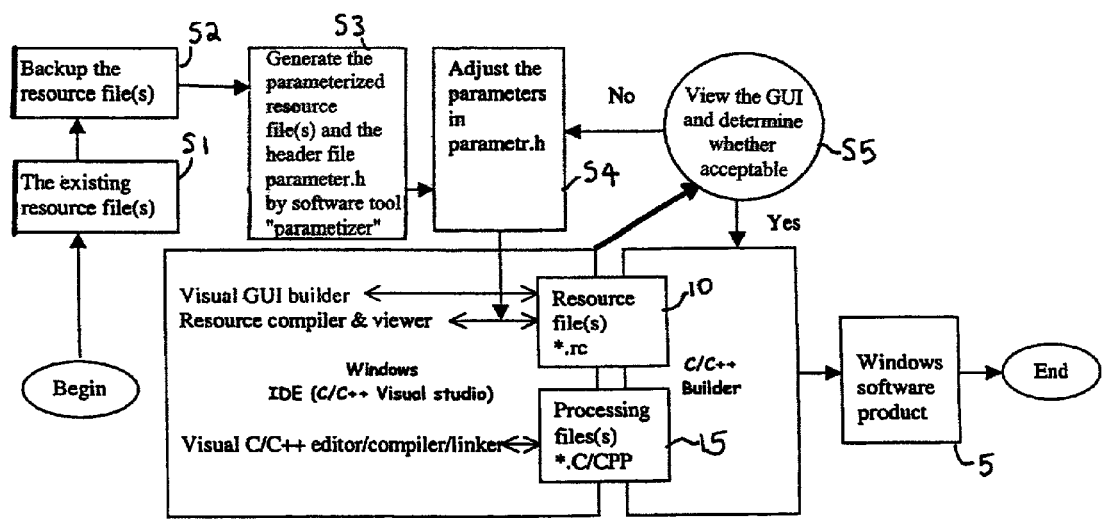
FIG. 3 illustrates an overall view of a software development operation of the present invention.

FIG. 3 illustrates the software development system of the present invention in further detail. In the system shown in FIG. 3, the resource files 10 and processing files 15 are generated similarly as discussed above with respect to the conventional operation shown in FIG. 1. Step S1 obtains the existing resource files 10, which are hard-coded. Step S2 initially backs up the resource files 10. Step S3 generates a soft-coded resource file, i.e., the parameterized resource file 22 and the corresponding header file 25 using a software tool "parametizer." Step S4 adjusts the parameters in the header file 25 if desired. Step S5 views the graphical user interface (GUI) and determines whether it is correct. When step S5 determines that the GUI is correct, i.e. Yes in step S5, then the parameterized resource file 22 with the header file 25 are provided to the C/C++ Builder to thereby generate the Windows™ software product 5. When step S5 determines that the GUI is not correct, i.e. No in step S5, then control is returned to step S4 to adjust parameters and return to step S5.

The three objects discussed above of (1) dialog boxes, (2) string tables, and (3) graphics file names can be described in three types as follows: (1) transform absolute valued four-coupled object dimensions to definitional parameter IDs; (2) transform Strings in String Table string definitions; and (3) transform .ICO and .BMP file names to file definitions.

The types (2) and (3) can be parameterized in a straightforward manner. For example, an icon file can be described in the resource file 10 as follows:

| IDI_APPICON | ICON | DISCARDABLE "Dialog.ICO" |

The icon file can then be uniquely parameterized as follows:

| IDI_APPICON | ICON | DISCARDABLE IDI_APPICON_ICON |

The ICI_APPICON_ICON can be defined in the parameterized header file 25 as follows:

| #define IDI_APPICON_ICON | "Dialog.ICO" |

Then, the initial icon file name "Dialog.ico" can be replaced by any icon file name.

As another example, a string in a string table can be described as follows:

| IDS_DESCRIPTION | "Dialog Example Application" |

The string can then be uniquely parameterized as follows:

| IDS_DESCRIPTION | IDS_DESCRIPTION_STRINGTABLE |

The IDS_DESCRIPTION_STRINGTABLE can be defined in the parameterized header file 25 as follows:

| #define IDS_DESCRIPTION-STRINGTABLE | "Dialog Example Application" |

The initial string "Dialog Example Application" can then be replaced by any string.

A more detailed description is now provided for the object of a dialog box.

A typical dialog template looks like the following:

```
<The dialog ID> DIALOG
    <Descriptions of dialog attributes>
    x, y, width, height
    <Descriptions of dialog styles including CAPTION>
BEGIN
    ...
    <Control 1 with its dimensions x1, y1, width1, height1>
    <Control 2 with its dimensions x2, y2, width2, height2>
    (A PUSHBUTTON may link to a child dialog.)
END
```

To parameterize the resource file, all caption strings will no longer be a constant string, e.g., &About, but instead will be a macro, e.g., ABOUT_CAPTION_HEAD ABOUT_CAPTION_HOTKEY ABOUT_CAPTION_TAIL where ABOUT is the unique GUI ID. Thus, the contents of a string table, icon names and bit map file names will be macros instead of constant strings, icon file names and bit map file names, respectively.

For example, assuming the caption is &About, then the parameterized macros can be as follows:

| #define ABOUT_CAPTION_HEAD | "" |
| #define ABOUT_CAPTION_HOTKEY | "&A" |
| #define ABOUT_CAPTION_TAIL | "bout" |

For four-coupled dimensions, several modes can be described as shown in Table 1 below. One particular mode may be suitable for one specific resizing or reallocating situation.

The implicit modes I–IV and IX are used, in this example, as a directive pair, e.g., //I . . . //0, while the explicit modes V–VIII and X are used, in this example, as a directive pair, e.g., //VI<an ID> . . . //0.

TABLE 1

Typical Parameterization Modes

| Parameterization Mode | (x, y) | (width, height) |
|---|---|---|
| I | x+<GUI_ID>_X_DELTA,y+<GUI_ID>_Y_DELTA | w+GUI_ID>_W_DELTA,h+<GUI_ID>_H_DELTA |
| II | x+<GUI_ID>_X_DELTA,y+<GUI_ID>_Y_DELTA | w*<GUI_ID>_W_SCALE,h*<GUI_ID>_H_SCALE |
| III | x*<GUI_ID>_X_SCALE,y*<GUI_ID>_Y_SCALE | w+<GUI_ID>_W_DELTA,h+<GUI_ID>_H_DELTA |
| IV | x*<GUI_ID>_X_SCALE,y*<GUI_ID>_Y_SCALE | w*<GUI_ID>_W_SCALE,h*<GUI_ID>_H_SCALE |
| V | x+<ID>_X_DELTA,y+<ID>_Y_DELTA | w+<ID>_W_DELTA,h+<ID>_H_DELTA |
| VI | x+<ID>_X_DELTA,y+<ID>_X_DELTA | w*<ID>_W_SCALE,h*<ID>_H_SCALE |
| VII | x*<ID>_X_SCALE,y*<ID>_Y_SCALE | w+<ID>_W_DELTA,h+<ID>_H_DELTA |
| VIII | x*<ID>_X_SCALE,y*<ID>_Y_SCALE | w*<ID>_W_SCALE,h*<ID>_H_SCALE |
| IX | <GUI_ID>_X_NEW,<GUI_ID>_Y_NEW | <GUI_ID>_W_NEW,<GUI_ID>_H_NEW |
| X | <ID>_X_NEW,<ID>_Y_NEW | <ID>_W_NEW,<ID>_H_NEW |

Modes IX and X in Table 1 replace hard-coded original values of dimensions in the resource file with new values found in the header file.

<GUI_ID> in Table 1 denotes <The dialog ID>.

<ID> in Table 1 denotes an auxiliary identifier for the directive.

As an example, <GUI_ID> is an implicit parameter for the mode and the actual ID is the immediately following dialog ID or control ID, while <D> is an explicit parameter and the actual ID is uniquely supplied by a developer. The modes and the formulas of Table 1 may be changed as needed for different problems to be solved.

In Table 1, width and height are simplified as w and h respectively.

In Table 1, delta denotes an offset that has a default value 0, and scale denotes a scale factor that has a default value 1. <GUI_ID> and <ID> in Table 1 are referred to as directive IDs.

Applying the parameterization mode II to the abstracted dialog template shown above, the resource file is transformed as follows.

```
// Beginning of the resource file
#include "parametr.h."
<The dialog ID>DIALOG                                //dialog ID line
<Descriptions of dialog attributes>
x + <The dialog ID>_X_DELTA,
y + <The dialog ID>_Y_DELTA,
width * <The dialog ID>_W_SCALE,
height * <The dialog ID>_H_SCALE
<Descriptions of dialog styles>
BEGIN                                                //dialog begin line
   . . .
   <Control 1 with corresponding dimension           //a control line
   x1 + <The dialog ID>_X_DELTA,
   y1 + <The dialog ID>_Y_DELTA,
   width1 * <The dialog ID>_W_SCALE,
   height1 * <The dialog ID>_H_SCALE>
   <Control 2 with corresponding dimension
   x2 + <The dialog ID>_X_DELTA,
   y2 + <The dialog ID>_Y_DELTA,
   width2 * <The dialog ID>_W_SCALE,
   height2 * <The dialog ID>_H_SCALE>
   . . .
   (A PUSHBUTTON link to a child dialog.)
   (Another PUSHBUTTON link to another child dialog.)
   . . .
END                                                  //dialog end line
   . . .
// End of resource file
```

The adjustable parameters with appropriate default values are included in a newly added header file parametr.h as shown below.

```
parametr.h:
#define<The dialog ID>_X_DELTA 0
#define<The dialog ID>_Y_DELTA 0
#define<The dialog ID>_W_SCALE 1
#define<The dialog ID>_H_SCALE 1
```

The transformed resource file including default parameters has made no actual changes in terms of results generated by the resource file. However, the transformed resource file allows a software developer to resize, allocate, and rearrange dialog objects by manually adjusting the corresponding parameters in a header file instead of having to use the visual IDE.

As shown in FIG. 3, the present invention employs a resource file parameterization, which is a two step procedure. In a first step, in order to specify options for parameterization, directives are added by a user to the regular resource file to be parameterized.

Exemplary usage definitions of parameterization directives, indicating what mode is selected and in which scope they are effected, are illustrated as follows:

| | |
|---|---|
| //#0 | End the corresponding directive scope. |
| //#I | Begin a directive scope as parameterization mode I (refer to Table 1). |
| //#II | Begin a directive scope as parameterization mode II (refer to Table 1). |
| //#III | Begin a directive scope as parameterization mode III (refer to Table 1). |
| //#IV | Begin a directive scope as parameterization mode IV (refer to Table 1). |
| //#V <ID> | Begin a directive scope as parameterization mode V (refer to Table 1). |
| //#VI <ID> | Begin a directive scope as parameterization mode VI (refer to Table 1). |
| //#VII <ID> | Begin a directive scope as parameterization mode VII (refer to Table 1). |
| //#VIII <ID> | Begin a directive scope as parameterization mode VIII (refer to Table 1). |
| //#IX | Begin a directive scope as parameterization mode IX (refer to Table 1). |
| //#X <ID> | Begin a directive scope as parameterization mode X (refer to Table 1). |

The //#0 directive is referred to as an end directive; the //#I–//#X directives are referred to as begin directives. The //#I–//#IV and //I#IX directives are referred to as local directives; the //#V–//#VIII and //#X directives are referred to as global directives and a directive identifier <ID> follows for each. A begin directive and end directive pair is referred to as a directive scope. An exemplary directive scope insertion syntax follows:

A directive must be inserted only at the beginning of a new line. A begin directive must match an end directive to form a directive scope.

The local directive scope may apply to one dialog template, while the global directive scope may apply anywhere.

Each global begin directive must have a unique ID attached.

Scope embedding is allowed.

A directive scope must include at least one four-coupled dimension, and must not break any such dimension.

To parameterize a dimension, the local dialog ID will be used for a local directive, and the designated directive identifier will be used for a global directive (refer to Table 1).

Then, in a second step a resource file parameterization tool—i.e., resource file parameterizer 20 as shown in FIG. 2—is run. In this example, the resource file parameterizer is a text file filter that requires one input file and one output file.

The resource file parameterizer converts a regular resource file 10 to the parameterized resource file 22 and header file 25, as shown in FIG. 2.

Figure 4A:
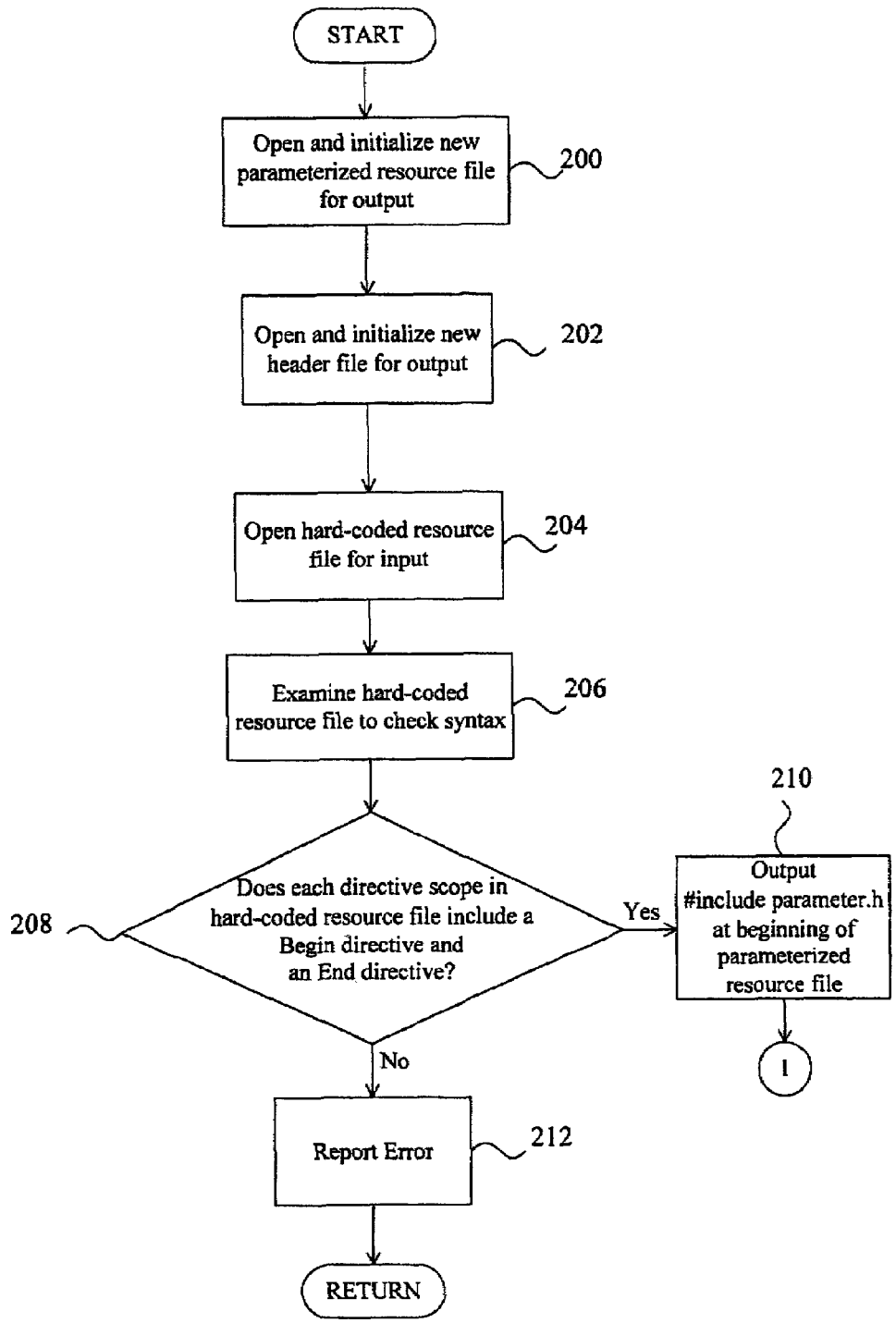
FIGS. 4A–4C are a flowchart of a parameterization operation on a hard-coded resource file.
Figure 4B:
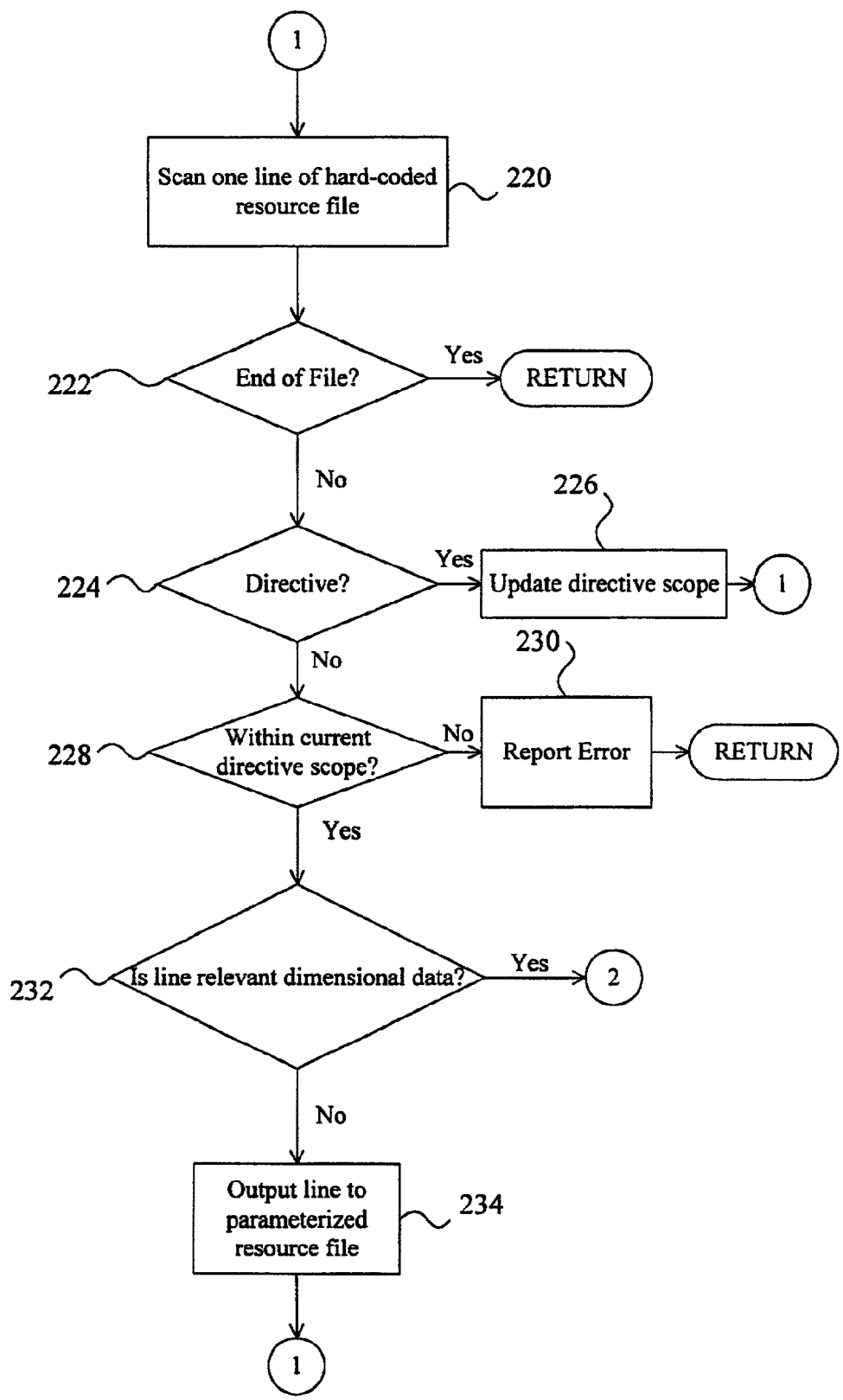
Figure 4C:
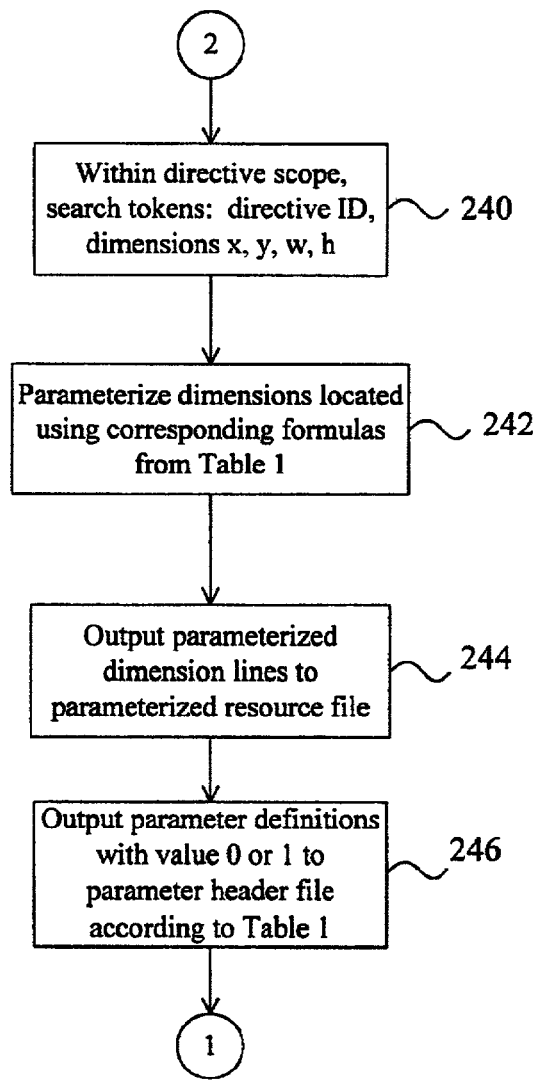

FIGS. 4A–4C are a flowchart of a parameterization operation on a hard-coded resource file. After starting, step 200 of FIG. 4A opens and intiliazes a new parameterized resource file for output. Step 202 opens and initialized a new header file for output. Step 204 opens a hard-coded resource file for input.

Step 206 examines the hard-coded resource file to check syntax. Step 208 determines whether each directive scope in the hard-coded resource file includes a Begin directive and an End directive. If step 208 determines that at least one directive scope does not include a Begin directive and an End directive, step 212 reports an error, and control is returned to the calling process.

If step 208 determines that each directive scope in the hard-coded resource file includes a Begin directive and an End directive, step 210 outputs "#include parameter.h" at the beginning of the parameterized resource file. Step 220 of FIG. 4B scans one line of the hard-coded resource file. Step 222 determines whether end of file has been reached. If step 222 determines that end of file has been reached, control is returned to the calling process.

If step 222 determines the end of file has not been reached, step 224 determines whether the scanned line is a directive. If step 224 determines that the scanned line is a directive, step 226 updates the directive scope, and control is returned to step 220.

If step 224 determines that the scanned line is not a directive, step 228 determines whether the line is within the current directive scope. If step 228 determines that the line is not within the current directive scope, step 230 reports an error and control is returned to the calling process.

If step 228 determines that the scanned line is within the current directive scope, step 232 determines whether the scanned line includes relative dimensional data. If step 232 determines that the scanned line does not include relevant dimensional data, step 234 outputs the scanned line to the parameterized resource file, and control is passed to step 220.

If step 232 determines that the scanned line includes relevant dimensional data, step 240 of FIG. 4C searches for tokens within the current directive scope: directive ID, and dimensions x, y, w, and h. Step 242 then parameterizes the dimensions located in step 240 using corresponding formulas from Table 1 which was discussed previously. Step 244 outputs the parameterized dimension lines to the parameterized resource file. For local directives, a local dialog ID is used. For global directives, the specified directive ID is used. Step 246 outputs parameter definitions with a value of 0 or 1, which are the default values, to the parameter header file according to the formulas from Table 1 as discussed previously. Control is then passed to step 220 of FIG. 4B.

FIGS. 7A–7B are a conventional resource file 400 corresponding to the graphical user interface 300 and icon 320 discussed previously with regard to FIGS. 5A–5B. An icon is defined in the conventional resource file 400 with a hard-coded text 410 for a file named "dispcalc.ico". A dialog is defined having a name DISPCALC 408 having dimensions 418 with values "0, 0, 92, 114." A CAPTION 412 has a hard-coded value of "DispCalc (32-bit)". An exemplary PUSHBUTTON has hard-coded dimension values 420 of "9, 90, 14, 15."

The resource file 400 of FIGS. 7A–7B is used to display the graphical user interface 300 and icon 320 shown in FIGS. 5A–5B. In this example, it is desired to double the size of the calculator 300, change the caption 302, and change the icon 320 shown in FIGS. 5A–5B to the appearance of the graphical user interface 330, caption 332 and icon 340 as shown in FIGS. 6A–6B.

FIGS. 8A–8B are a modification 500 of the conventional resource file 400 of FIGS. 7A–7B with directives added with the intent of generating the modifications which were discussed previously. The resource file 500 of FIG. 8A includes a Begin directive 502 having a value "//#IV" which appears as a comment in the code. An End directive 504 having a value "//#0" also appears as a comment. The two directives 502 and 504 enclose the code which is to be parameterized. According to Table 1, mode "IV", corresponding to the "//#IV" directive, specifies that the x, y, width and height dimensions will all be parameterized to scale factors. The mode "IV" includes an implicit ID "DISPALC."

FIG. 8C is an exemplary resource file portion corresponding to the code shown in FIG. 7A defining the dialog defined having a name DISPCALC 408 discussed previously. The resource file portion of FIG. 8C illustrates two directives 520 and 520 enclosing code to be parameterized, corresponding to the first row of buttons to be displayed on the calculator. According to Table 1, mode "VIII", corresponding to the "//VIII FIRST_ROW" directive, specifies that the x, y, width and height dimensions will all be parameterized to scale factors, using an explicit ID "FIRST_ROW."

FIGS. 9A–9C are an exemplary generated parameterized resource file 600 based on the modification of the conventional resource file 500 discussed previously with regard to FIGS. 8A–8B. An icon parameter 610 of FIG. 9B replaces the hard-coded icon file name 410 discussed previously with regard to FIG. 7A. A dialog name DISPCALC 608 of FIG. 9B remains constant corresponding to the dialog name 408 discussed previously with regard to FIG. 7A. Parameterized dimension names 618 of FIG. 9B replace the hard-coded x, y, width and height dimensions 418 discussed previously with regard to FIG. 7A. These parameterized dimensions are determined according to the four scaled parameters specified by mode "IV" found in Table 1.

A CAPTION 612 of FIG. 9B has a parameterized value "DISPCALC_CAPTION" replacing the hard-coded value "DispCalc (32-bit)" of the CAPTION 412 discussed previously with regard to FIG. 7A. A PUSHBUTTON "0" has parameterized dimension values 620 of FIG. 9B which replace the hard-coded dimension values 420 discussed previously with regard to FIG. 7A according to mode "IV" of Table 1. Thus, each of the dimension values 618 and 620 shown in FIG. 9B have been parameterized in accordance with a scaling factor as specified by mode "IV" of Table 1.

FIG. 9D is an exemplary parameterized portion 630 of the resource file portion with directives added which was discussed previously with regard to FIG. 8C. More particularly, FIG. 9D illustrates parameterized code resulting from parameterization of the code representing the first row of buttons of the calculator to be displayed which was previously discussed regarding FIG. 8C as the code enclosed by the directive pair 520 and 522 of FIG. 8C. Each of the dimension values for the x, y, height and width dimensions is replaced by parameterized values with the explicit ID "FIRST_ROW," specified as the explicit ID by directive 520 as shown in FIG. 8C, used as the prefix for all of the substituted parameters of the parameterized portion 630 of the resource file portion of FIG. 9D.

FIG. 10A is an exemplary parameterized resource header file 700 generated for the parameterized resource file 600 discussed previously with regard to FIGS. 9A–9B. An icon parameter definition 710 specifies a default icon file name of "dispcalc.ico" corresponding to the hard-coded value 410 of the original resource file 400 discussed previously with regard to FIG. 7A. Similarly, a caption definition 712 of FIG. 10A specifies a default value of "DispCalc (32-bit)" corresponding to the hard-coded CAPTION value 412 of the original resource file 400 discussed previously with regard to FIG. 7A. Each of the parameterized dimension scaling factors 720 are assigned a default value of 1 in FIG. 10A so that the parameterized dimension values 618 and 620 of FIG. 9B produce the original corresponding dimension values 418 and 420 discussed previously with regard to FIG. 7A.

FIG. 10B is an exemplary parameterized resource header file 800 generated by a user for the parameterized resource file 600 of FIGS. 9A–9B which is used to generate the desired graphical user interface 330, caption 332 and icon 340 shown in FIGS. 6A–6B which were discussed previously. The resource header file 800 of FIG. 10B assigns a new file name value "calc.ico" to an icon parameter 810. A calculator caption 812 assigns a new value "Calculator" to display the caption 332 of the calculator 330 as shown in FIG. 6A. Thus, the previous display of "DispCalc (32-bit)" in caption area 302 of the calculator 300 displayed in FIG. 5A is replaced by the caption "Calculator" 332 as shown in FIG. 6A. The icon file name 810 of FIG. 10B causes the icon 320 displayed in FIG. 5B to be replaced by the icon 340 as shown in FIG. 6B.

Dimension parameters 820 are assigned values of 2 so that the scale is doubled in size, or multiplied by two according to the dimension parameterization values 618 and 620 discussed previously with regard to FIG. 9B to display the calculator GUI 330 of FIG. 6A, which is displayed as twice the size of the calculator GUI 300 shown in FIG. 5A.

FIG. 10C is an exemplary parameterized resource header file 830 generated by a user for the exemplary parameterized resource file portion 630 of FIG. 9D which was discussed previously. The resource header file 830 of FIG. 1C assigns a value of 1 to the scale factors for each of the dimensions x, y, width and height. For example, the "#define" command 832 assigns a value of 1 to the parameter "FIRST_ROW_X_SCALE" which appears in the exemplary parameterized portion 630 of FIG. 9D, thereby indicating that the ultimately generated values for the x dimension of the first row of the generated calculator display will be their initial values (for this example, multiplied by a value of 1) as indicated in the "PUSHBUTTON" code illustrated between the directives 520 and 522 of FIG. 8C. If, for example, the "#define" command 832 were to assign a value of 2 to the parameter "FIRST_ROW_X_SCALE" then the generated values for the x dimension of the first row of the generated calculator display will be their initial values multiplied by a value of 2.

FIGS. 8A–10A discussed above illustrate (1) insertion of implicit directive mode IV in the resource file, and (2) the resulting parameterized resource file and companion header file generated by the parameterizer. FIG. 8C illustrates the use of the explicit directive mode VIII so that all generated parameter names have the specified ID as their prefix.

Thus it can be seen that, by parameterizing an original resource file generated with conventional software techniques, and using the mode techniques specified, for example by Table 1, it is possible to generate a parameterized resource file so that, in order to modify the output generated by the file, a software engineer need only make minor modifications to a simple header file by assigning values to individual parameters only once, in contrast to having to modify the file using the IDE, or having to manually change each of the hard-coded values of the original generated resource file.

Figure 11A:
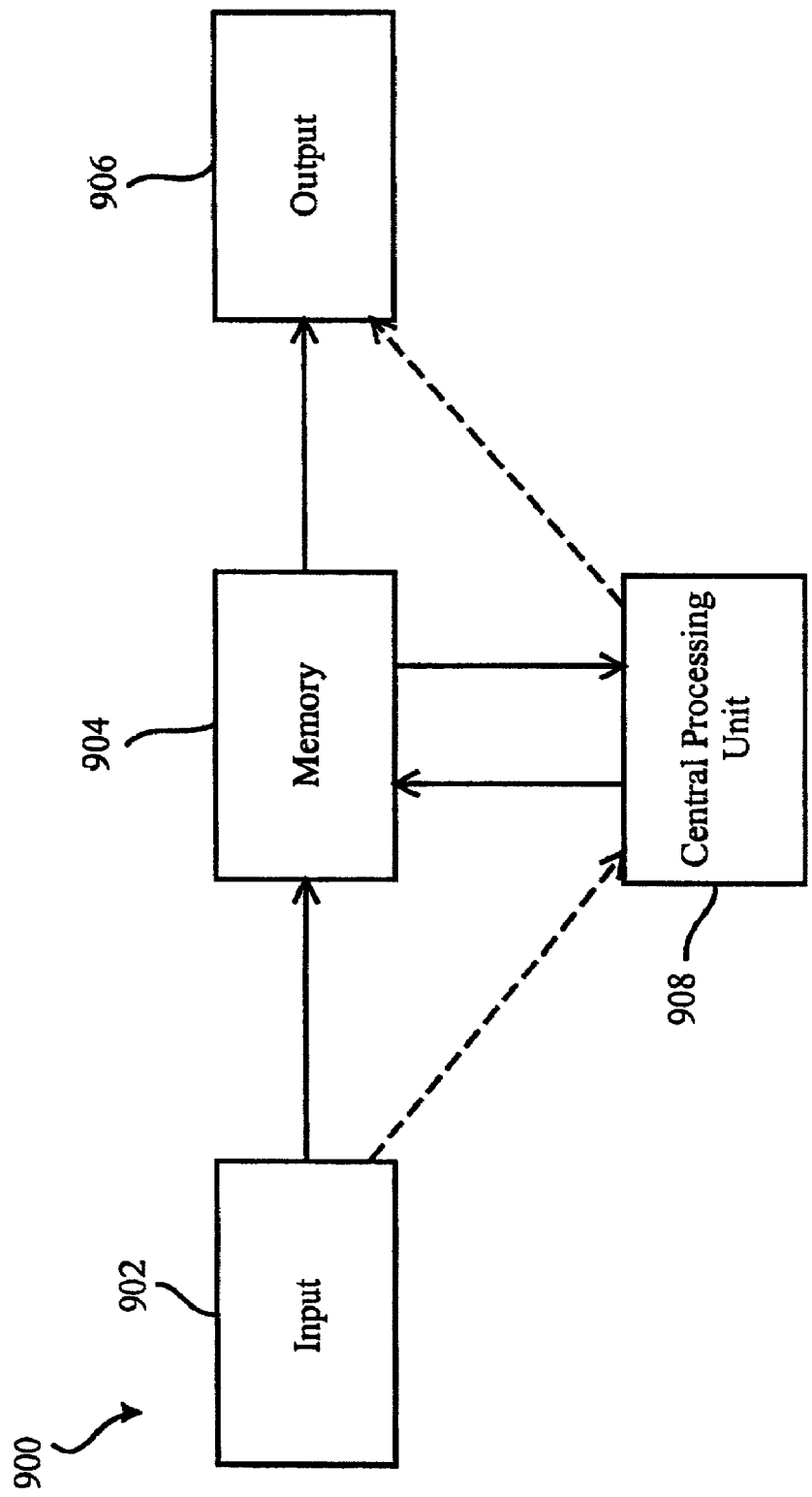
FIG. 11A illustrates an exemplary portion of a generalized computer system upon which portions of the invention may be implemented.

FIG. 11A illustrates an exemplary portion of a generalized computer system 900 upon which portions of the invention may be implemented. For example, the configurations of the invention may each be implemented by one or more computers having a generalized configuration as exemplified by FIG. 11A or by one or more computers having configurations similar to those of FIGS. 11A and 11B described below.

An input 902 of FIG. 11A communicates with a memory 904 and a Central Processing Unit 908. The Central Processing Unit 908 communicates with the memory 904 and an output 906. The output 906 is also in communication with the memory 904. The Central Processing Unit 908 may include an arithmetic/logic unit and a control unit in the form of hardware and/or software (not shown). One or more of inputs 902 may each be in communication with one or more memories 904 and/or Central Processing Units 908. One or more Central Processing Units 908 may be in communication with one or more outputs 906 and/or memories 904 and/or inputs 902. One or more memories 904 may be in communication with one or more inputs 902 and/or Central Processing Units 908 and/or outputs 906. Clearly, a plurality of variations of computer hardware configurations may be realized in a network of computer systems upon which portions of the invention may be implemented.

Figure 11B:
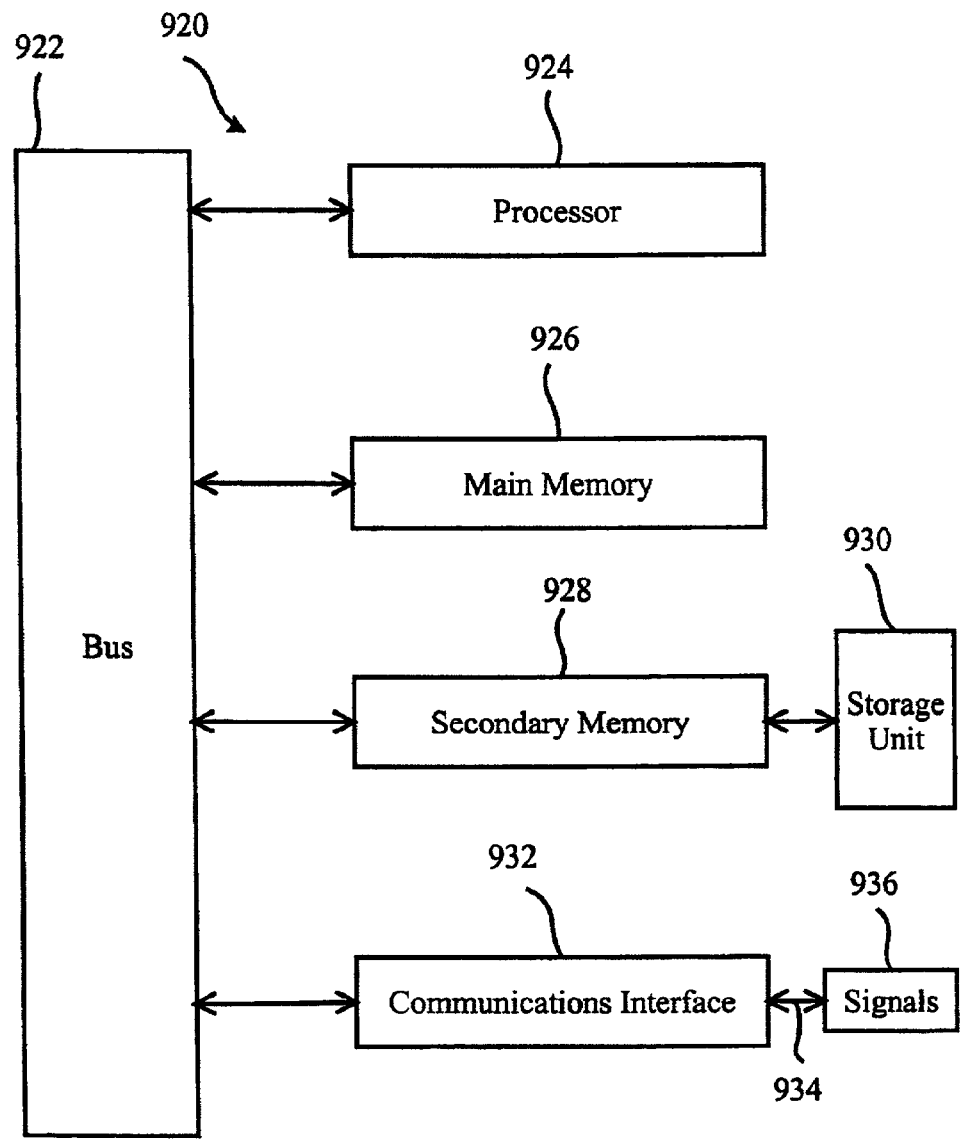
FIG. 11B illustrates an exemplary portion of a generalized hardware configuration, in the format of a workstation, upon which portions of the invention may be implemented.

FIG. 11B illustrates an exemplary hardware configuration of a generalized computer system 920 upon which portions of the invention may be implemented. One or more processors 924 are connected to a communication bus 922. The communication bus 922 also communicates with a main memory 926, preferably a random access memory ("RAM"). A secondary memory 928 communicating with the communication bus 922 may also be included in the computer system 920. The secondary memory 928 may include, for example, a hard disk drive, a removable storage drive such as a floppy disk drive, a magnetic tape drive, an optical disk drive, a program cartridge and cartridge interface, a removable memory chip (e.g., EPROM, PROM, ROM), or any other similar storage medium. The secondary memory 928 may be in communication with a storage unit 930 such as a floppy disk, magnetic tape, optical disk, or other storage medium read by and written to by a secondary memory device. The storage unit 930 includes a computer usable storage medium for storing computer software and data.

The computer system 920 may also include a communications interface 932 in communication with the communication bus 922 for transferring software and data between the computer system 920 and external devices. Examples of communications interfaces 932 include a modem, a network interface (e.g., a network card), a communications port, a PCMCIA slot and card, and other similar interfaces. Software and data transferred via the communications interface 932 are in the form of signals 936 which are provided to the communications interface 932 via a channel 934. The signals 936 may be electronic, electromagnetic, optical or other signals capable of being received by the communications interface 932. The channel 934 may be implemented using wire, cable, fiber optics, a phone line, a cellular phone link, an RF link or other communications channels.

Computer programs are stored in main memory 926 and/or secondary memory 928. Computer programs may be received via the communications interface 932. Computer programs, when executed by the processor 924, enable the computer system 920 to perform the features of the present invention.

This invention may be conveniently implemented using a network of conventional general purpose digital computers and/or microprocessors programmed according to the teachings of the present specification, as will be apparent to those skilled in the computer art from reading the above descriptions regarding the figures. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer or other device, or a plurality of networked computers or other devices, to perform a process of the invention. The storage medium can include, but is not limited to, any type of disk including floppy disks, optical discs, CD-ROMs, and magneto-optical disks, ROMs, RAMs, PROMs, EPROMs, EEPROMs, magnetic or optical cards, or any type of media suitable for storing electronic instructions.

Stored on any one or on a combination of computer readable media, the present invention includes software for driving a device or devices for implementing the invention. Such software may include, but is not limited to, device drivers, operating systems, development tools, and applications software. Such computer readable media further includes the computer program product of the present invention. The instructions stored on the computer program product drive a device or devices for implementing the invention. This device, or these devices, have been described, or are known to those of ordinary skill in the art. The computer code devices of the present invention can be any interpreted or executable code mechanism, including but not limited to scripts, interpreters, dynamic link libraries, Java classes, and complete executable programs.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A computer implemented method, comprising:
    providing a first resource file for displaying a graphical user interface, said first resource file including one of a physical dimension having a first constant value and a caption having a second constant value;
    generating a second resource file by inserting at least one directive in said first resource file, wherein said at least one directive indicates at least one modification to be made to said first resource file;

processing said second resource file, based on the inserted at least one directive, to create (1) a third resource file that includes at least one parameter that replaces one of said first constant value and said second constant value, and (2) a first header file that stores a value for said at least one parameter.

2. A method according to claim 1, further comprising:

generating a second header file that includes an assignment of one of a third constant value to said physical dimension and a fourth constant value to said caption expressed as said at least one parameter.

3. A system, comprising:

a first device configured to input a first resource file for displaying a graphical user interface, said first resource file including one of a physical dimension having a first constant value and a caption having a second constant value;

a second device configured to generate a second resource file by inserting at least one directive in said first resource file, wherein said at least one directive indicates at least one modification to be made to said first resource file;

a third device configured to process said second resource file to create (1) a third resource file that includes at least one parameter that replaces one of said first constant value for said physical dimension and said second constant value for said caption, and (2) a first header file that includes an assignment of one of said first constant value to said physical dimension and said second constant value to said caption expressed as said at least one parameter.

4. A system according to claim 3, further comprising:

a fourth device configured to generate a second header file that includes an assignment of one of a third constant value to said physical dimension and a fourth constant value to said caption expressed as said at least one parameter.

5. A computer program product comprising a computer readable medium embodying program instructions for causing a system to perform the steps of:

inputting a first resource file for displaying a graphical user interface, said first resource file including one of a physical dimension having a first constant value and a caption having a second constant value;

generating a second resource file by inserting at least one directive in said first resource file, wherein said at least one directive indicates at least one modification to be made to said first resource file;

processing said second resource file, based on the inserted at least one directive, to create (1) a third resource file that includes at least one parameter that replaces one of said first constant value and said second constant value, and (2) a first header file that stores a value for said at least one parameter.

6. A computer program product according to claim 5, wherein said program instructions cause said system to further perform the step of:

generating a second header file that includes an assignment of one of a third constant value to said physical dimension and a fourth constant value to said caption expressed as said at least one parameter.

* * * * *